J. T. BUSTIN.
QUADRANT.
No. 175,416. Patented March 28, 1876.
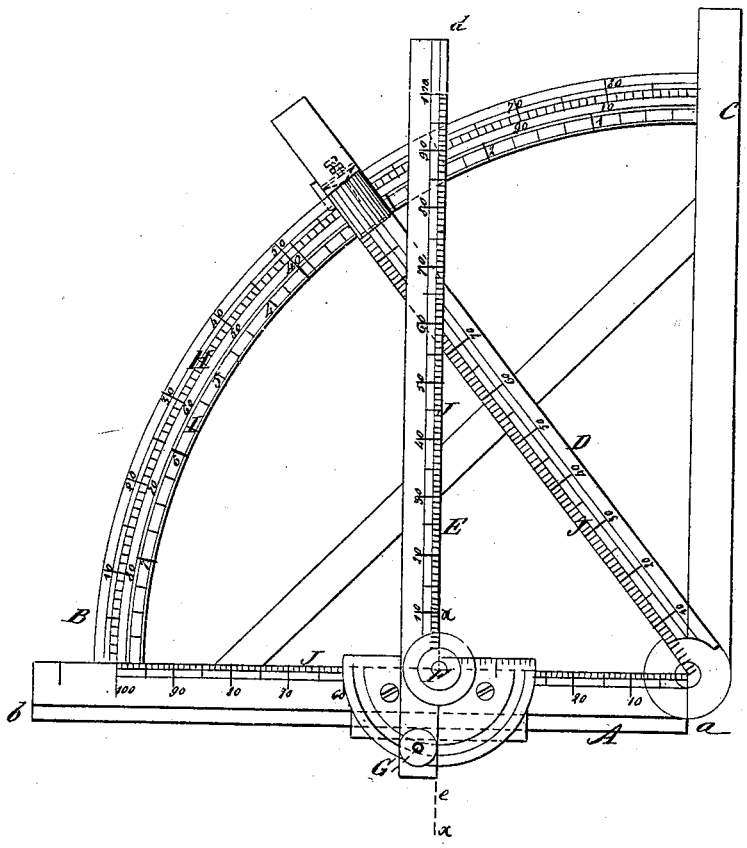

UNITED STATES PATENT OFFICE.

JAMES T. BUSTIN, OF ST. JOHN, NEW BRUNSWICK, ASSIGNOR OF ONE-HALF HIS RIGHT TO CHARLES W. BERTEAUX, OF BROOKLYN, N. Y.

IMPROVEMENT IN QUADRANTS.

Specification forming part of Letters Patent No. 175,416, dated March 28, 1876; application filed February 14, 1876.

*To all whom it may concern:*

Be it known that I, JAMES T. BUSTIN, of St. John, in the county of St. John, in the Province of New Brunswick, have invented a new and Improved Instrument for Finding a Ship's Position, of which the following is a specification:

My invention consists of a quadrant with a scaled traverse-bar contrived in a simple and efficient way for finding a ship's position, and also distances from lights, headlands, and other objects.

Figure 1 is a plan view of my improved instrument. Fig. 2 is a side elevation, and Fig. 3 is a section of Fig. 1, on line $x$ $x$.

Similar letters of reference indicate corresponding parts.

A, B, and C represent the frame of a quadrant. D is the indicator, and E is a scale mounted on the part A of the frame so as to slide along it freely, and it is also fixed to turn on the pivot F, and has a binding-screw, G, to fasten it in any position. In addition to the degree scale H of the arc B, I apply a scale, I, of points, and fractions thereof, and on the indicator-slide E, and the bar A, I apply a scale, J, representing miles. From $a$ to $b$ represents the meridian-line, the sliding-scale represents the latitude-line, the indicator represents the ship's course, being moved to any point or degree required for the purpose.

The course and distance being known, to find the difference of latitude and departure, set the indicator at the course run; then slide the bar E until it cuts the indicator D at the number of miles run, then the number of miles marked on bar E will be the difference of latitude, and the miles marked on the meridian $a$ will be the departure. To find the difference of longitude, take the middle or mean latitude as a course and set the index D at said course; then move the bar E until the number of miles of departure on said bar cuts on the index, when the number of miles marked on the index will be the difference in longitude in miles.

The arc B represents one hundred and eighty degrees or points of the compass, and is useful for taking the bearings of lights and finding the distance from the same; for example, to find the distance from two lights, the distance and bearing of each being known, take the bearings of both lights, and supposing one bearing north and the other northeast, the difference in the bearings of the two will be four points, and suppose the lights bear from one another north-northwest and south-southeast, and distant thirty miles, then set the index on four points, which will represent the bearing of the lights from the ship. The bar E being north and south must be moved by turning it on pivot F two points, or set at northeast, then move the bar till thirty miles on it cuts on the index, where the distance from one light will be seen, and the miles on the meridian show the distance from the other.

Having thus described my invention, I claim as new and desire to secure by Letters Patent—

The combination of the sliding and pivoted bar E with the bar A, arc C, and index D, the bars A and E, and the index D, being scaled in miles, and the arc being provided with the scale I of points, substantially as specified.

JAMES T. BUSTIN.

Witnesses:
T. B. MOSHER,
ALEX. F. ROBERTS.